3,094,498
RESINOUS COMPOSITIONS
Paul H. Landolt, Danville, Ill., assignor to General Electric Company, a corporation of New York
No Drawing. Filed Dec. 7, 1959, Ser. No. 857,502
1 Claim. (Cl. 260—28)

This invention relates to new and useful compositions. More particularly, the invention relates to resinous compositions, which can be cured at room temperatures and possess desirable physical, chemical and dielectric properties, including exceptional weatherproof characteristics as evidenced by superior flame resistance, mechanical strength and moisture resistance.

The resinous compositions of the invention include a substantially unreacted chlorendic anhydride, in addition to an epoxy resin cured with an aromatic amine. Bituminous compounds, antimony trioxide and inert fillers may also be included. The compositions are especially adapted for use as an encapsulating material for electrical devices, such as fluorescent lamp ballasts, which are to be employed in outdoor applications and which cannot withstand being heated at temperatures ranging from 160 to 180 degrees centigrade in order to effect a cure of the resin with an anhydride curing agent. Fluorescent lamp ballasts generally employ dielectric liquid filled capacitors which are damaged when subjected to such high temperatures. It is desirable therefore that an economical encapsulant be developed that employs an epoxy resin which can be cured at room temperature.

To possess commercially acceptable weatherproof characteristics, an encapsulant must meet the stringent requirements of various tests, such as impact, flammability, humidity, dielectric strength, elevated temperature, water absorption and accelerated aging tests. The requirements for encapsulating materials to be used in outdoor applications involve a combination of properties difficult to produce in a single composition. The encapsulating materials must have excellent impact resistance, but at the same time should have superior flame resistance properties. Further, the materials should possess good heat conducting characteristics and at the same time should have good dielectric properties. It is also necessary that the encapsulant not corrode the materials on which they are applied, must be stable and must not undergo any appreciable contraction in volume upon solidification.

Heretofore, resinous compositions employing bituminous compounds and inert fillers, which could effectively be cured at room temperature, were not commercially acceptable for use as an encapsulant since they did not possess the requisite weatherproof characteristics. A principal drawback of such resinous compositions of the prior art has been that no economical resinous composition curable at room temperature has been available which possesses both excellent strength and flame resistant properties. Although some economical resinous compositions have been developed that possess satisfactory strength properties, it was found that they failed to meet the flame resistance requirements for outdoor applications.

Accordingly, it is a principal object of this invention to provide a resinous composition which is characterized by improved flame resistance and mechanical strength.

A more specific object of the invention is to provide resinous compositions suitable for use as an encapsulant for electrical devices employed in outdoor applications.

It is a further object of the invention to provide resinous compositions containing bituminous compounds and characterized by superior flame resistance and mechanical strength which can be cured at room temperatures.

Broadly stated, the product of the invention comprises a cured resinous composition including bituminous compounds, an epoxy resin cured with an aromatic amine, a filler and a substantially unreacted chlorendic anhydride in an amount ranging from 3 to 10 percent by weight of the composition. Unexpectedly, I discovered that a resinous composition cured at room temperature (10 to 60 degrees centigrade) by means of an amine curing agent, which includes substantially unreacted chlorendic anhydride, will result in a product having the superior heat resistance characteristic of a chlorendic anhydride cured system without the poor strength properties inherent in a resin produced by such a system. Further, the resinous composition can be cured at room temperatures, which makes it possible to encapsulate capacitors with liquid dielectrics that cannot be heated to high temperatures.

In another aspect of the invention, a resinous composition employing an epoxy resin cured with an aromatic amine curing agent and possessing significantly improved heat resistance is obtained by including in the composition as an additional constituent a powdered epoxy resin previously cured by a chlorendic anhydride. The encapsulant produced from such a resinous composition also was found to exhibit the improved flame resistance characteristic of the product of a chlorendic anhydric cured system and the improved strength characteristic of the product of an aromatic amine cured system.

Those parts of my invention which are considered to be new are set forth in detail in the claim appended hereto. The invention, however, may be better understood and further objects and advantages thereof appreciated from a consideration of the following description.

The epoxy, epoxide or ethoxyline resins, as they are variously called, which are suitable for use in the composition of the invention, are well known in the art. Generally, such epoxy resins comprise a polyether derivative of a polyhydric organic compound, said derivative containing 1, 2 epoxy groups, said compound being selected from the class consisting of polyhydric alcohols and phenols containing at least two phenolic hydroxy groups. For example, U.S. Patent 2,324,483 to Castan discloses epoxy resin compositions comprising the reaction product of phenols having at least two phenolic hydroxy groups and an epihalogenohydrin such as epichlorohydrin, the product having at least two epoxy groups and being cured to a thermoset, infusible mass by the use of a carboxylic or polybasic acid or acid anhydride, such as phthalic anhydride. The epoxy resins used herein have more than one epoxy group per molecule and can be prepared by reacting a polyhydroxy alcohol or phenol such as hydroquinone, resorcinol, glycerine and condensation products of phenols with ketones, for example, bis-(4-hydroxy phenyl)-2, 2-propane with epichlorohydrin.

Epoxy resins, which can be used in the compositions of the present invention, are commercially available under the name of Epon by Shell Chemical Corporation, under the name Araldite by the Ciba Company, under the name of Epi-Rex resins by Devoe-Raynolds Company and under the name of ERL resins by the Bakelite Company. In Table I the epoxide equivalents, and melting points are given for representative resins:

TABLE I

| Epoxy Resin | Epoxide Equivalent Weight (grams) | Melting Point, °C. |
|---|---|---|
| Epon 828 | 192 | 9. |
| Epon 1062 | 140–165 | Liquid. |
| Araldite 6010 | 192 | Do. |
| Araldite 6020 | 200–205 | Do. |
| ERL 2774 | 175–200 | Do. |
| Epi-Rez 510 | 175–200 | Do. |

The epoxide equivalent weights as set forth in Table I represent the grams of resin containing one gram equivalent of epoxide. The epoxy equivalency, as the term is used herein, is defined as the number of 1, 2-epoxy groups per molecule and is obtained by dividing the epoxide equivalent weight by the molecular weight. The epoxy resins suitable for use in the compositions of this invention have a 1,2-epoxy equivalency greater than 1.

Representative of the aromatic amine curing agents which may be used in the practice of the present invention are 4–4' methylenedianiline, diaminodiphenyl sulfane, and m-phenylenediamine. It will be appreciated that one or a blend of two or more of the aromatic amines can be used. The term, "aromatic amine curing agent," as used herein, includes one or more aromatic amines. Commercially available mixtures of aromatic amines which may be used in accordance with the present invention are Curing Agent Z manufactured by the Shell Chemical Corporation and ZZLA–0800 manufactured by the Bakelite Company. These mixtures of aromatic amine curing agents also contain small amounts of other ingredients to prevent crystallization and are in a liquid state, which permits them to be readily combined with the liquid epoxy at room temperature.

In some of the hereinafter described illustrative embodiments of the invention, Curing Agent Z was used. It is a mixture of the aromatic amines, 4-4' methylenedianiline and m-phenylenediamine and includes a small quantity of ingredients which prevents the crystallization of the amines. It is usually added to the resin in a concentration of approximately 20 parts per hundred.

The amounts of the curing agent to use will depend upon the epoxy resin and the particular aromatic amines employed. Best results are obtained when the curing agent and the epoxy resin are combined in nearly stoichiometric amounts. One active hydrogen atom should be provided for each epoxy group. As an example, for Epon 828 a concentration of m-phenylenediamine in the amount of 14 parts per hundred of the resin would be required to produce best results. In general, a concentration of the aromatic amine ranging from 10 to 30 parts per hundred of the resin may be employed.

A small amount of a tertiary amine, preferably benzyldimethylamine, may be added to the composition in amounts ranging from 0.1 to 3 parts per hundred of the epoxy resin for the purpose of accelerating the cure. Other tertiary amines, such as tris(dimethylaminomethyl) phenol, alpha-methylbenzyl dimethylamine, and dimethyl amino methyl phenol may be used.

The chlorendic anhydride used in the composition of the present invention is a hexachloro endomethylene tetrahydro phthalic anhydride and has the following structure:

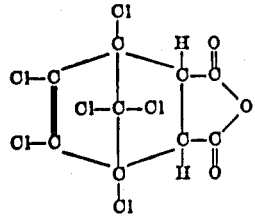

The use of chlorendic anhydride as a curing agent for epoxy resins is well known in the art. Further, it is well known that, in general, resins cured by a chlorendic anhydride curing agent possess a better flame resistance and a poorer compressive and impact strength as compared with the product of an aromatic amine cured system. Unexpectedly, I have discovered that the best properties obtainable by both curing systems can be combined in single product by employing a resinous composition which includes chlorendic anhydrine in an amount ranging from 3 to 10 percent by weight. The curing of the resinous composition is effected by an aromatic amine curing agent. Since the chlorendic anhydride is relatively unreactive at room temperatures, it will be seen that the aromatic amine reacts with the molecules of the epoxy resin. As the mixture gels during the curing process, the unreacted chlorendic anhydride is isolated from the epoxy groups and immobilized. The resultant product is characterized by both superior flame resistance and strength properties. To further improve the flame resistance of the cured resinous composition antimony trioxide may be added in an amount ranging from 1 to 10 percent by weight.

Also, significantly improved flame resistance and impact strength can be obtained in an amine cured epoxy resin composition by adding to the composition from 5 to 20 percent by weight of a powdered epoxy resin previously cured by a chlorendic anhydride. The chlorine present in the composition contributes to the improved flame resistance without a diminution of its impact and compressive strength. By introducing the powdered epoxy resin with the chlorine as an inert constituent of the composition results in the advantage that an encapsulant possessing superior flame resistance is produced thereby which can be cured at room temperature.

The bituminous compounds such as coal tar or bituminous pitch which can be used in the compositions of the present invention should not inhibit curing nor lower the heat distortion point appreciably. They must be compatible with the epoxy resin and should be free of any corrosive contaminants. Further, they must not decrease the adhesion properties of the cured resinous composition. Representative examples of commercially available bituminous compounds which are suitable for use in the composition of the present invention are coal tar pitch CP524 manufactured by the Pittsburgh Coke & Chemical Company and Bitumen C manufactured by the Shell Chemical Corporation. The bituminous compounds may be added to the composition for the purpose of reducing the cost of the encapsulant and also to further improve its moisture resistance.

To further reduce the amount of the resin and curing agent required and thereby decrease the cost of the encapsulant, sand was used in the hereinafter described exemplications of the invention. It will be understood that when an inert filler such as sand, mica, or calcium carbonate is added to the composition, the desirable properties of the epoxy resin are not seriously affected. It was found that as much as 65 percent by weight of sand could be employed in the composition of the present invention without seriously impairing the properties of the composition. Also, introducing a small amount of glass fibers into the composition will improve the strength properties without impairing the other properties of the resinous composition.

The compositions in accordance with the present invention were prepared by first mixing all of the constituents together with the exception of the curing agent, the accelerator and chlorendic anhydride. The viscosity of this mixture can be varied to suit the requirements of a particular application by incorporating into the mixture a diluent, such as phenyl glycidyl ether and the like. In the compositions used to exemplify the present invention, I have employed triphenylphosphite as a diluent to reduce the viscosity of the resin mixture in order that it might be freely poured into a mold.

In order to determine the flame resistance of the hereinafter described exemplifications of this invention samples were made up of the cured material ¼ inch thick, ½ inch wide and 5 inches long. Each sample was clamped in a sheet metal test enclosure 2 feet in length and having a 1 foot square cross section. The test enclosure was open at the top and open on one long side. The test flame applied to a sample was provided by a Tirrill burner adjusted to provide a 5 inch flame with a 1½ inch inner blue cone and mounted at an angle of 20 degrees from the vertical. The flame was applied for ten seconds and then removed.

If the specimen subjected to the flame extinguished itself within 5 seconds, the flame was again applied for a period of 10 seconds, starting 5 seconds after the end of the first application. However, if, after the first application of the flame the specimen continued to burn longer than 5 seconds, but not longer than ten seconds, the test flame was reapplied immediately after the specimen stopped burning. This process was repeated until each specimen was subjected to 5 ten-second applications of the test flame.

A specimen was considered to meet the flame resistance requirement for outdoor applications if two out of three specimens tested did not continue to burn longer than 10 seconds after each of the five applications of the test flame and if there was no dripping from the specimens at any part of the test. The phrase, "flame resistance suitable for outdoor applications" as used herein means that the encapsulating material can meet the requirements of the above described flammability test.

To further demonstrate the suitability of the resinous compositions of the invention for outdoor applications, low temperature impact tests were conducted. The encapsulated ballasts used to exemplify the utility of the composition as an encapsulant were placed in a cold box at a temperature of minus 35 degrees centigrade for three hours. The cold ballast was subjected to a 5 foot pound impact. A steel ball weighing 1.18 pounds was dropped vertically a distance of 4.24 feet on the top center of the ballast. Further, the cold ballast was subjected to a pendulum impact test. A steel ball was rigged as a pendulum, which, at rest, hung at the center of the side of the encapsulated ballast. The pendulum was pulled through an arc such that the ball was 4.24 feet higher than the rest position and was released to strike the ballast.

An encapsulating material that did not crack when subjected to both of these tests was considered to meet the impact strength requirements for outdoor applications. The phrase, "impact strength suitable for outdoor applications" means that the material meets the requirements of the above described tests.

The following examples illustrate the preparation of the resinous compositions of several embodiments of the present invention. It is not intended thereby to limit the invention to these illustrative embodiments. The parts given and any percentages are by weight unless otherwise indicated.

*Example I*

| | |
|---|---|
| Epon 828 | 16.1 |
| Coal tar | 7.2 |
| Triphenylphosphite | 4.1 |
| Curing Agent Z | 5.4 |
| Sand (200 mesh) | 54.0 |
| Benzyldimethylamine | .2 |
| Antimony trioxide | 5.7 |
| Chlorendic anhydride | 7.3 |

*Example II*

| | |
|---|---|
| Epon 828 | 16.6 |
| Coal tar | 7.2 |
| Triphenylphosphite | 4.1 |
| Curing Agent Z | 5.5 |
| Sand (200 mesh) | 56.0 |
| Benzyldimethylamine | 0.2 |
| Antimony trioxide | 4.5 |
| Chlorendic anhydride | 5.9 |

*Example III*

| | |
|---|---|
| Epon 828 | 17.0 |
| Coal tar | 7.4 |
| Triphenylphosphite | 4.3 |
| Curing Agent Z | 5.8 |
| Sand (200 mesh) | 57.0 |
| Benzyldimethylamine | 0.2 |
| Antimony trioxide | 3.7 |
| Chlorendic anhydride | 4.6 |

*Example IV*

| | |
|---|---|
| Epon 828 | 17.5 |
| Coal tar | 7.5 |
| Triphenylphosphite | 4.4 |
| Curing Agent Z | 5.8 |
| Sand (200 mesh) | 58.0 |
| Benzyldimethylamine | 0.2 |
| Antimony trioxide | 2.5 |
| Chlorendic anhydride | 3.1 |

*Example V*

| | |
|---|---|
| Epon 828 | 67.0 |
| m-Phenylenediamine | 9.5 |
| Chlorendic anhydride | 13.5 |
| Antimony trioxide | 10.0 |

*Example VI*

| | |
|---|---|
| Epon 828 | 61.0 |
| 4-4' methylenedianiline | 17.5 |
| Chlorendic anhydride | 12.5 |
| Antimony trioxide | 9.0 |

*Example VII*

| | |
|---|---|
| Epon 828 | 64.0 |
| m-Phenylenediamine | 4.0 |
| 4-4' methylenedianiline | 9.5 |
| Chlorendic anhydride | 13.0 |
| Antimony trioxide | 9.5 |

*Example VIII*

| | |
|---|---|
| Epon 828 | 62.0 |
| m-Phenylenediamine | 3.5 |
| 4-4' methylenedianiline | 9.5 |
| Chlorendic anhydride | 25.0 |

*Example IX*

Component A (a cured chlorendic anhydride system):

| | |
|---|---|
| Epon 828 | 48 |
| Chlorendic anhydride | 52 |

| | |
|---|---|
| Epon 828 | 59.0 |
| Component A | 24.0 |
| m-Phenylenediamine | 8.0 |
| Antimony trioxide | 9.0 |

All of the ballasts encapsulated with the compositions of Examples I, II and III passed the flammability and impact strength tests and were found to be suitable for outdoor applications. They were used to encapsulate fluorescent lamp ballasts for outdoor applications, since they can be produced economically. Although the encapsulating materials of this invention can be applied to ballasts which have been previously treated with an asphaltic potting compound, it was found that an encapsulated ballast possessing improved strength properties can be obtained if the encapsulating material is applied to an untreated ballast since the resinous compositions of the present invention result in an encapsulant with good adhesion properties.

The composition set forth in Example IV is presented to illustrate a composition in which a minimum amount of the unreacted chlorendic anhydride is employed. All of the samples of this example could not pass the flammability tests.

It will be understood that in the preparation of all of the examples illustrating the present invention all of the constituents with the exception of the curing agent, the accelerator and chlorendic anhydride, were first thoroughly mixed and then the latter ingredients were added. The chlorendic anhydride was added last in order to prevent any possible reaction with the aromatic amine. It was found that aliphatic and heterocyclic amines cannot be used satisfactorily since such amines react too quickly with the chlorendic anhydride.

In Examples V, VI, VII, VIII and IX, I have illustrated various modifications that can be made to the resinous compositions of this invention without impairing its properties. It will be apparent that the inert fillers and the bituminous compounds can be eliminated without any appreciable effect on the properties.

The embodiment of the invention, as illustrated in Example IX, involves the preparation of two resinous compositions. Component A is first prepared. It comprises a chlorendic anhydride cured system, which is ground to powdered form, and it is then added to the second composition as an inert constituent. The second composition is then cured at room temperature by means of an aromatic amine curing agent.

Encapsulating procedures other than the one described herein may be carried out in order to utilize the compositions of this invention. It will be apparent that the present compositions may be applied as coatings by conventional dipping and surface coating procedures. Further, it will be appreciated that the compositions also have utility as potting materials for use in conjunction with many types of electrical devices. The products obtained by the practice of this invention are characterized by excellent flame resistance, impact resistance and humidity resistance without need for high temperature curing to obtain the improved properties.

What I claim as new and desire to secure by Letters Patent of the United States is:

A composition of matter comprising (A) the reaction product of (1) a complex epoxy resin consisting of at least two epoxide groups and comprising the polyether derivative of a ployhydric compound selected from the class consisting of polyhydric alcohols having adjacent hydroxyl groups and phenols having at least two phenolic hydroxyl groups and (2) an aromatic diamine curing agent having at least one hydrogen atom attached to the nitrogen atoms, (B) from 3 to 10 percent by weight of substantially unreacted chlorendic anhydride, (C) from 1 to 10 percent by weight of antimony trioxide, (D) an inert filler comprising up to 65 percent by weight of the composition and (E) bituminous compounds comprising up to 10 percent of the composition, said chlorendic anhydride being immobilized in the cured composition.

References Cited in the file of this patent
UNITED STATES PATENTS

| | | |
|---|---|---|
| 2,765,288 | Whittier et al. | Oct. 2, 1956 |
| 2,906,720 | Simpson | Sept. 29, 1959 |

OTHER REFERENCES

Bassin: S.P.E. Journal, vol. 14, No. 5, pp. 36–38 (1958).